Jan. 24, 1928.
R. C. JOHNSTON ET AL
1,657,087
SNAP HOOK
Filed Jan. 21, 1927
2 Sheets-Sheet 1
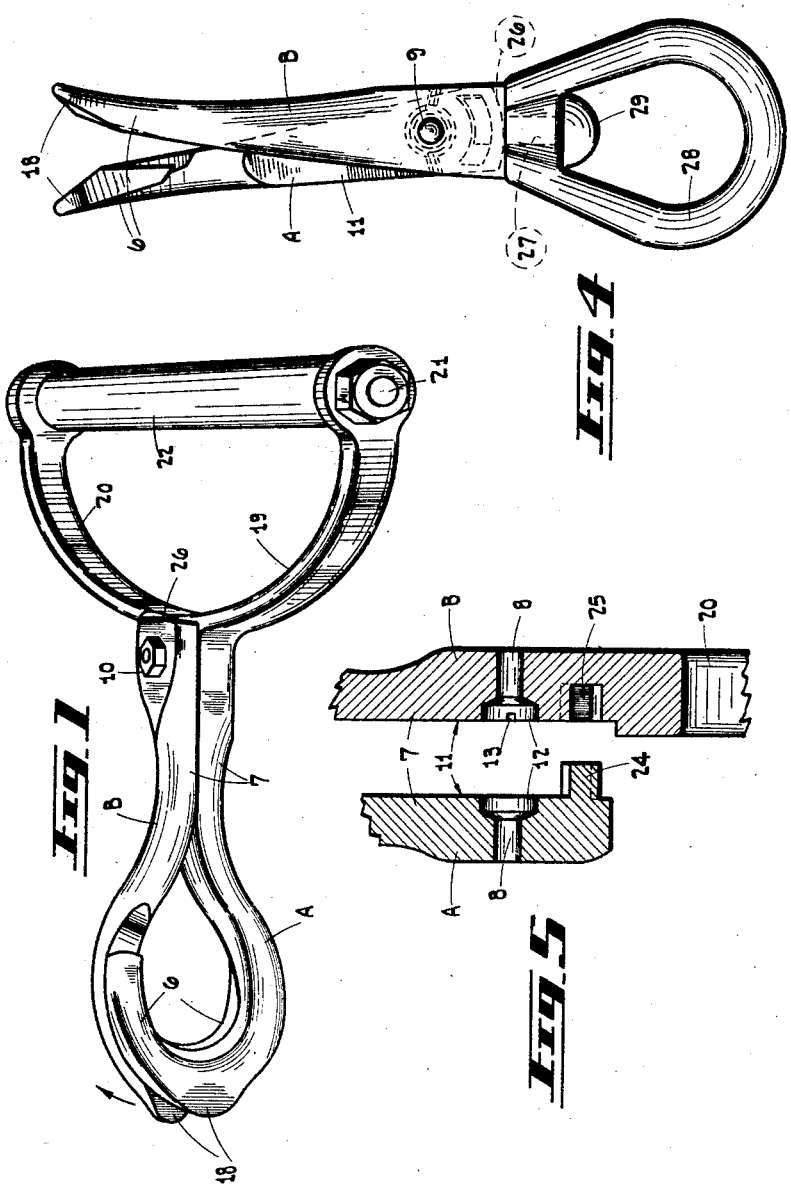
INVENTORS
JOHN SOUCY.
RICHARD COLYER JOHNSTON.
JOE JACKSON McEWEN.
JOHN LARUE.
By Harold D. Penney
ATTORNEY.

Jan. 24, 1928.
R. C. JOHNSTON ET AL
1,657,087
SNAP HOOK
Filed Jan. 21, 1927
2 Sheets-Sheet 2
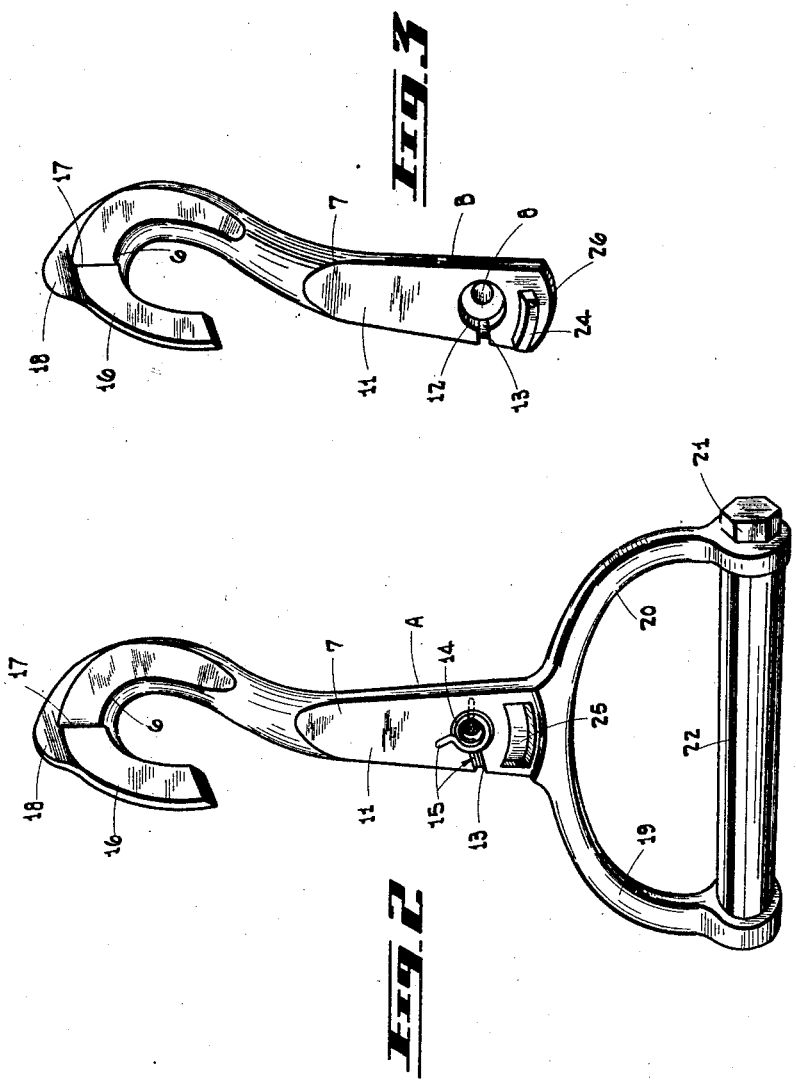
INVENTORS
JOHN SOUCY.
RICHARD COLYER JOHNSTON.
JOE JACKSON McEWEN.
JOHN LARUE.
By Harold D. Penney
ATTORNEY.

Patented Jan. 24, 1928.

1,657,087

UNITED STATES PATENT OFFICE.

RICHARD COLYER JOHNSTON, JOHN SOUCY, JOE JACKSON McEWEN, AND JOHN LARUE, OF NELSON, BRITISH COLUMBIA, CANADA.

SNAP HOOK.

Application filed January 21, 1927. Serial No. 162,536.

Our present invention relates to improvements in a snap hook appertaining more particularly to one of that class wherein a pair of sister hooks pivoted together open laterally on a pivot lying in a plane parallel to the plane of the hooks, adapted for use in any and all of the many places formerly served by hooks of this type.

An object is to provide a hook of this character wherein the laterally separating pair of hook members are normally held in contact with each other by a spring coiled around the connecting pivot whose ends are fastened one to each of the hook members and wherein the opening of such hook members is restricted within limits by the action of co-operating stop means carried by the pivot ends of the hook members.

Another object is to provide a snap hook scientifically fashioned to resist the most severe strains and twists and that is secure against accidental opening, the contacting faces of the laterally separating hook members being similarly formed, each inclining outwardly from the hook end to the mid point of the hooks and then breaking away to an equal depth below the common lateral plane, so that when nestled in normal position none but lateral displacement is possible.

A still further object is to provide an improved hook as described characterized by structural simplicity, strength, durability and low cost of production, the same being thereby rendered commercially desirable.

To the accomplishment of these and related objects our invention resides in the construction, combination and arrangement of parts as shall be hereinafter more fully described, illustrated in the accompanying drawings and pointed out in the claims hereunto appended.

The invention will be best understood and can be most clearly described when reference is had to the drawings, forming a part of this disclosure, wherein like characters indicate like parts throughout the several views.

In the drawings:—

Fig. 1 is a perspective of our improved snap hook;

Figs. 2 and 3 are perspective views of the co-operating halves;

Fig. 4 is a side elevation of a slightly modified form partly opened; and

Fig. 5 is a sectional detail of the pivot end of the sister hook members showing the opening stop means and the pivot perforations and spring seats.

This invention comprises essentially a pair of sister hook members A and B each having a hook 6 fashioned on one end and a shank portion 7 at the other end with a perforation 8 passing through such shank with its axis in a plane parallel to the plane of the hook 6.

A bolt 9 with a co-operating nut 10 on its threaded end connects the two hook members A and B being inserted in the perforations 8 brought into registry. The contacting face 11 of the shanks 7 are machined and recessed concentric with the perforations 8 to provide the seats 12 each with a slot 13 communicating with the edge of the shank. A coil spring 14, with outwardly bent ends 15 to engage in the slots 13, encircles the pivot bolt 9 and maintains the normal engagement of the hook ends 6.

The said hook ends 6 have their inner or engaging faces machined to present a novel contour, for, from the hook end to the mid point of the hook it inclines laterally outwards as at 16 whereupon the lateral face drops back to a point below the common lateral plane equal to the height of the incline 16 thereabove forming a sharp shoulder 17. The top of the hook has a lip 18 extending therefrom that tapers away from the machined face to provide a wedge shaped entrance to the laterally separating sister hooks.

This specific form of hook end permits of the ready insertion of a link or the like to be connected to the hook by lateral separation yet prevents any but authorized displacement.

The foregoing description of the hook members A and B has been common to both but variations occur by which they can be distinguished. The hook member A has the shank remote from the hook 6 and beyond the perforation 8 bifurcated to provide a pair of divergent arms 19 and 20 terminally apertured, with aligned axis at right angles to the pivot bolt 9, to receive a transverse bolt 21 on which a sleeve 22 is carried. The yoke formed by these arms 19 and 20 projects beyond the machined face 11 of the shank 7 to form a shoulder 23. An arcuate slot 24 coaxial with the perforation 8 is cut in the face 11 of this shank, between said perforation 8 and said shoulder 23, extending the major portion of the width thereof.

On the face 11 of the shank of the hook member B in corresponding position with the arcuate slot 24 is a co-operating projection 25 of substantially lessened dimensions, adapted to seat in said slot and to travel therein on the relative hinging movement of the hook members A and B to limit the lateral spacing of the hook ends thereof. The end of the shank 7 of said latter hook member is terminally arced as at 26, to clear the shoulder 23 of the yoke.

In the modification shown in Fig. 4, the shank 7 of the hook member B is not bifurcated but ends in a stem 27 on which a link 28 is radially pivoted, the stem 27 being terminally hammered into a head 29 confining the link 28. In either case the purpose of this shank-carried ring is to serve as an anchoring means for a strap or other fastening.

From the foregoing description taken in connection with the accompanying drawings it will be manifest that a snap hook is provided that will fulfill all the necessary requirements of such a device, but as many changes could be made in the above description and many apparently widely different embodiments of our invention constructed within the scope of the appended claims without departing from the spirit or scope thereof, it is intended that all matters contained in the said accompanying specification and drawings shall be interpreted as illustrative and not in a limited sense.

What we claim as new and desire to secure by Letters Patent is:—

1. An improved snap hook comprising a pair of sister hook members each having a shank portion and a hook on the end remote from said shank; a pivot connecting the shanks of said pair of sister hook members, its axis lying in a plane parallel to the plane of the hook ends, whereby said hook ends separate laterally; an arcuate slot, coaxial with said pivot, cut in the shank of one of said hook members and a co-operating projection adapted for reception thereby configurated in corresponding position on the shank of the other of said hook members whereby the lateral separating of the hook ends of said sister hook members, by relative hinging on said pivot is restricted within limits by the play of said projection travelling circumferentially in said slot.

2. An improved snap hook comprising a pair of sister hook members each having a shank portion and a hook on the end remote from said shank, a pivot connecting the shanks of said pair of sister hook members, its axis lying in a plane parallel to the plane of the hook ends, a recessed seat in said shank concentric with said pivot, a slot communicating with the edge of the shank from said recess, a coil spring mounted about said pivot housed within said complemental recesses, the ends of said spring being bent radially and anchored, one in each of said slots, whereby said hook ends are normally held in contact with each other and means for limiting the hinging of said sister hook members on said pivot against the action of said coil spring.

3. An improved snap hook comprising a pair of sister hook members each having a shank portion and a hook on the end remote from said shank and a pivot connecting the shanks of said pair of sister hook members, its axis lying in a plane parallel to the plane of the hook ends whereby said hook ends separate laterally, the engaging faces of said hook ends being fashioned to prevent any but lateral parting thereof, said hooks on their engaging faces inclining outwardly from the tip thereof to the midpoint of the hook and there broken away to a depth below the common plane of engagement equal to the maximum height of the incline thereabove substantially as described.

4. An improved snap hook comprising a pair of sister hook members each having a shank portion and a hook on the end remote from said shank; a pivot connecting the shanks of said pair of sister hook members, its axis lying in a plane parallel to the plane of the hook ends whereby said hook ends separate laterally; a coil spring carried by said pivot for normally holding the hook ends of said sister hook members in engagement; means to limit the relative hinging movement of said hook members on said pivot and means configurated on the engaging faces of said hook ends to prevent any but lateral parting thereof.

5. An improved snap hook comprising a pair of sister hook members each having a shank portion and a hook on the end remote from said shank; a pivot connecting the shanks of said pair of sister hook members, its axis lying in a plane parallel to the plane of the hook ends whereby said hook ends separate laterally; a coil spring carried by said pivot for normally holding the hook ends of said sister hook members in engagement; means to limit the relative hinging movement of said hook members on said pivot; means configurated on the engaging faces of said hook ends to prevent any but lateral parting thereof and means carried by the shank of one of said sister hook members and extended longitudinally therefrom adapted to provide an anchoring link or element, substantially as described.

In testimony whereof we hereunto affix our signatures.

RICHARD COLYER JOHNSTON.
JOHN SOUCY.
JOE JACKSON McEWEN.
JOHN LARUE.